United States Patent

(12) United States Patent
Jafarkhani et al.

(10) Patent No.: US 7,453,965 B1
(45) Date of Patent: Nov. 18, 2008

(54) DIFFERENTIAL TRANSMITTER DIVERSITY TECHNIQUE FOR WIRELESS COMMUNICATIONS

(75) Inventors: Hamid Jafarkhani, Middletown, NJ (US); Vahid Tarokh, Madison, NJ (US)

(73) Assignee: AT&T Corp., New York, NY (US)

( * ) Notice: Subject to any disclaimer, the term of this patent is extended or adjusted under 35 U.S.C. 154(b) by 85 days.

(21) Appl. No.: 11/653,610

(22) Filed: Jan. 16, 2007

Related U.S. Application Data

(60) Continuation of application No. 11/088,353, filed on Mar. 24, 2005, now Pat. No. 7,164,729, which is a continuation of application No. 10/425,103, filed on Apr. 28, 2003, now abandoned, which is a division of application No. 09/296,514, filed on Apr. 22, 1999, now Pat. No. 6,587,515.

(60) Provisional application No. 60/119,396, filed on Feb. 10, 1999.

(51) Int. Cl.
*H04B 7/10* (2006.01)
*H04L 1/02* (2006.01)

(52) U.S. Cl. ........................ 375/347; 375/267; 375/299; 455/101; 455/103; 455/133; 455/137

(58) Field of Classification Search ................. 375/299, 375/267, 347, 349, 144, 148; 455/101, 132, 455/103, 133, 137
See application file for complete search history.

(56) References Cited

U.S. PATENT DOCUMENTS

| 4,222,115 | A | * | 9/1980 | Cooper et al. | ............... 375/130 |
| 5,202,903 | A | * | 4/1993 | Okanoue | ................... 375/347 |
| 5,542,107 | A | | 7/1996 | Kay | |
| 5,574,989 | A | * | 11/1996 | Watson et al. | ............... 455/101 |
| 6,115,427 | A | | 9/2000 | Calderbank et al. | |
| 6,185,258 | B1 | | 2/2001 | Alamouti et al. | |
| 6,839,378 | B1 | * | 1/2005 | Sourour et al. | .............. 375/142 |

* cited by examiner

*Primary Examiner*—Phuong Phu

(57) ABSTRACT

Input signals of each frame are encoded by mapping the signals onto a coordinate system dictated by the symbols of the previous frame, and symbols from a constellation are selected based on the results of such mapping. Received signals are detected by preprocessing the signals detected at each antenna with signals detected by the antenna at the immediately previous frame, and then applied to a maximum likelihood detector circuit, followed by an inverse mapping circuit.

2 Claims, 1 Drawing Sheet

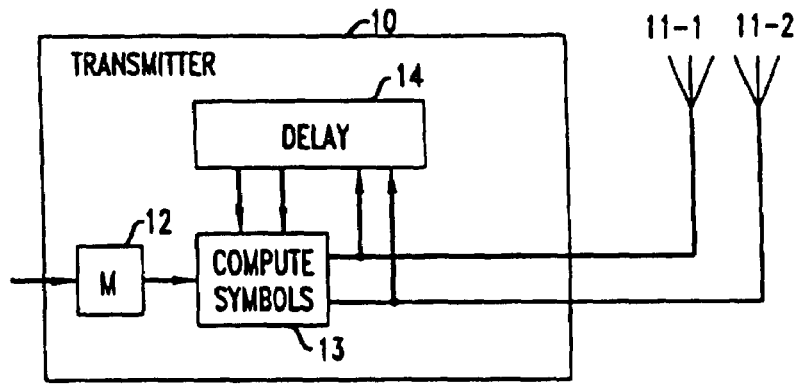
FIG. 1
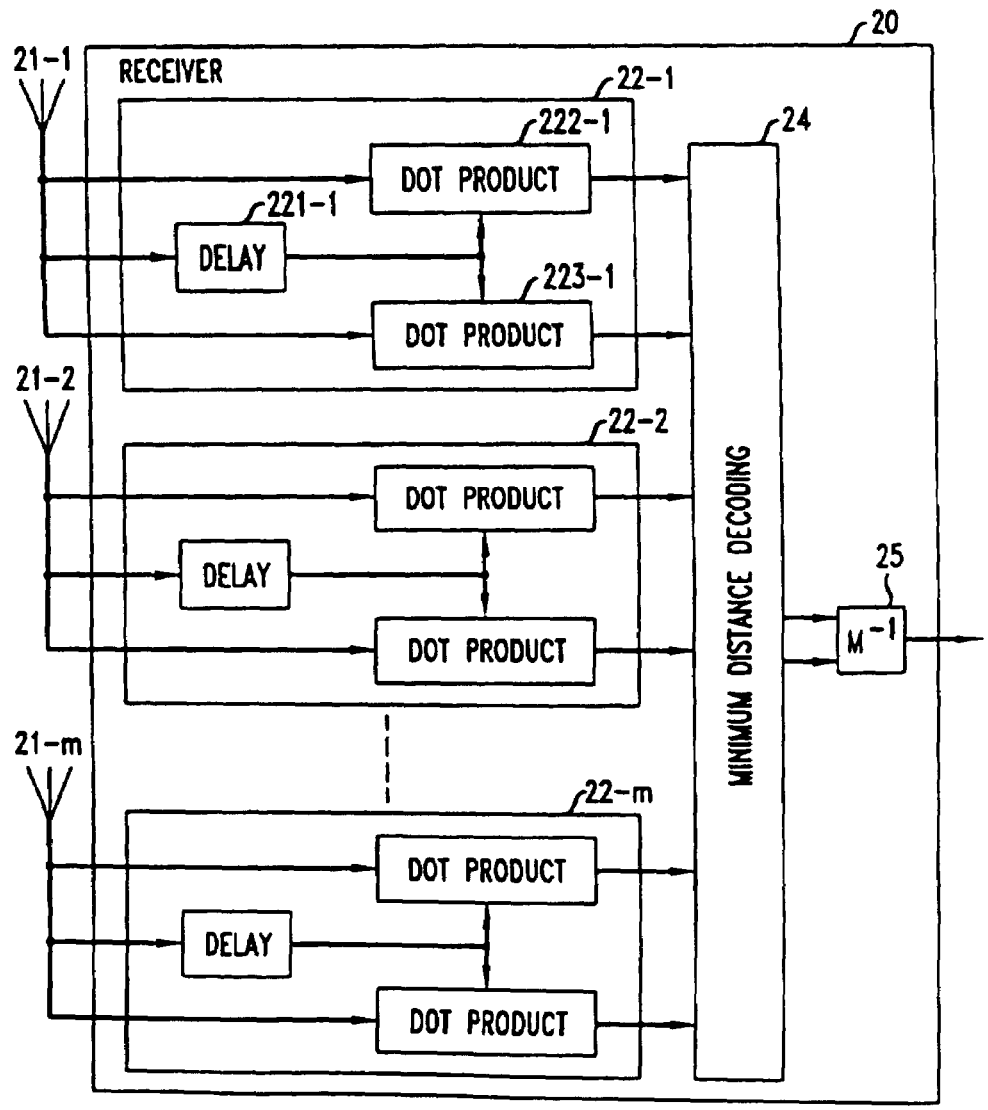

DIFFERENTIAL TRANSMITTER DIVERSITY TECHNIQUE FOR WIRELESS COMMUNICATIONS

REFERENCE TO RELATED APPLICATIONS

This application is a continuation of Ser. No. 11/088,353, filed Mar. 24, 2005, now U.S. Pat. No. 7,164,729 which is a continuation of divisional application Ser. No. 10/425,103 filed Apr. 28, 2003, now abandoned which is a divisional of application Ser. No. 09/296,514, filed Apr. 22, 1999, now U.S. Pat. No. 6,587,515 which claims priority from provisional application 60/119,396, filed Feb. 10, 1999.

BACKGROUND OF THE INVENTION

This invention relates to wireless communication and, more particularly, to techniques for effective wireless communication in the presence of fading and other degradations.

Recently, some interesting approaches for transmitter diversity have been suggested. A delay diversity scheme was proposed by A. Wittneben in "Base Station Modulation Diversity for Digital SIMULCAST," Proceeding of the 1991 IEEE Vehicular Technology Conference (VTC $41^{st}$), PP. 848-853, May 1991, and in "A New Bandwidth Efficient Transmit Antenna Modulation Diversity Scheme for Linear Digital Modulation," in Proceeding of the 1993 IEEE International Conference on Communications (IICC '93), PP. 1630-1634, May 1993. The proposal is for a base station to transmit a sequence of symbols through one antenna, and the same sequence of symbols—but delayed—through another antenna.

U.S. Pat. No. 5,479,448, issued to Nambirajan Seshadri on Dec. 26, 1995, discloses a similar arrangement where a sequence of codes is transmitted through two antennas. The sequence of codes is routed through a cycling switch that directs each code to the various antennas, in succession. Since copies of the same symbol are transmitted through multiple antennas at different times, both space and time diversity are achieved. A maximum likelihood sequence estimator (MLSE) or a minimum mean squared error (MMSE) equalizer is then used to resolve multipath distortion and provide diversity gain. See also N. Seshadri, J. H. Winters, "Two Signaling Schemes for improving the Error Performance of FDD Transmission Systems Using Transmitter Antenna Diversity," *Proceeding of the* 1993 *IEEE Vehicular Technology Conference* (VTC 43rd), pp. 508-511, May 1993; and J. H. Winters, "The Diversity Gain of Transmit Diversity in Wireless Systems with Rayleigh Fading," *Proceeding of the* 1994 *ICC/SUPERCOMM*, New Orleans, Vol. 2, PP. 1121-1125, May 1994.

Still another interesting approach is disclosed by Tarokh, Seshadri, Calderbank and Naguib in U.S. application, Ser. No. 08/847635, filed Apr. 25, 1997 (based on a provisional application filed Nov. 7, 1996), where symbols are encoded according to the antennas through which they are simultaneously transmitted, and are decoded using a maximum likelihood decoder. More specifically, the process at the transmitter handles the information in blocks of M1 bits, where M1 is a multiple of M2, i.e., M1=k*M2. It converts each successive group of M2 bits into information symbols (generating thereby k information symbols), encodes each sequence of k information symbols into n channel codes, and applies each code of a group of codes to a different antenna.

When knowledge of the channel is available neither at the transmitter nor at the receiver, the above schemes require the transmission of pilot symbols. For one transmit antenna, differential detection schemes exist that neither require the knowledge of the channel nor employ pilot symbol transmission. These differential decoding schemes are used, for instance, in the IEEE IS-54 standard. This motivates the generalization of differential detection schemes for the case of multiple transmit antennas.

A partial solution to this problem was proposed in U.S. patent application Ser. No. 09/074,224 filed on May 7, 1998, where the detected sequence is used to estimate the channel at the receiver, and those estimates are fed back and used to detect the next transmitted set of symbols. Therefore, the '224 patent application disclosure can be through of as a joint channel and data estimation.

SUMMARY OF THE INVENTION

Improvement in the art is realized by utilizing the fact that a space time encoding at the transmitter can be constructed where the symbols transmitted over a plurality of antennas in the time slots of a frame are orthogonal to each other. With this realization, in accordance with the principles of this disclosure, the inputs signals of each frame are mapped onto a coordinate system dictated by the symbols of the previous frame, and symbols from a constellation are selected based on the results of such mapping. Received signals are detected by preprocessing the signals detected at each antenna with signals detected by the antenna at the immediately previous frame, and then applied to a maximum likelihood detector circuit, followed by an inverse mapping circuit.

BRIEF DESCRIPTION OF THE DRAWINGS

FIG. 1 is a block diagram of a transmitting unit and a receiving unit in conformance with the principles disclosed herein.

DETAILED DESCRIPTION

FIG. 1 depicts an arrangement where a transmitting unit 10 has two transmitting antennas, 11-1 and 11-2, and a receiving unit 20 has m receiving antenna, 21-1, 21-2, . . . , 21-m. At each time slot t, signals $c_t^i$, i=1,2 are transmitted simultaneously from the two transmit antennas. The coefficient $\alpha_{i,j}$ is the path gain from transmit antenna i to receive antenna j. The path gains are modeled as samples of independent complex Gaussian random variables with variance 0.5 per real dimension. The wireless channel is assumed to be quasi-static, so that the path gains are constant over a frame of length l and vary, if at all, from one frame to another.

After time t the signal $r_t^j$ that is received at antenna j is given by $$r_t^j = \sum_{i=1}^{2} \alpha_{i,j} c_t^i + \eta_t^j \qquad (1)$$

where the noise samples $\eta_t^j$ are independent samples of a zero-mean complex Gaussian random variable with variance 1/(2SNR) per complex dimension. The average energy of the symbols transmitted from each antenna is normalized to be 1/2, so that the average power of the received signal at each receive antenna is 1 and the signal to noise ratio is SNR.

Assuming coherent detection, the receiver computes the decision metric $$\sum_{i=1}^{2}\sum_{j=1}^{m}\left|r_i^j - \sum_{i=1}^{2}\alpha_{i,j}c_t^i\right|^2 \quad (2)$$

over all codewords $$c_1^1 c_1^2 c_2^1 c_2^2 \ldots c_1^1 c_1^2, \quad (3)$$

and decides in favor of the codeword that minimizes the sum of equation (2).

In the FIG. 1 arrangement, the encoding matrix of transmitting unit 10 is $$G = \begin{pmatrix} x_1 & x_2 \\ -x_2^* & x_1^* \end{pmatrix}, \quad (4)$$

which means that as 2b bits arrive at the encoder at each frame, constellation signals $s_1$, and $s_2$ are selected, and setting $x_1=s_1$, the first column of the matrix is transmitted in time slot t=1 and the second column of the matrix is transmitted in time slot 2.

Maximum likelihood detection amounts to minimizing the decision statistic $$\sum_{j=1}^{m}\left(|r_1^j - \alpha_{1,j}s_1 - \alpha_{2,j}s_2|^2 + |r_2^j + \alpha_{1,j}s_2^* - \alpha_{2,j}s_1^*|^2\right) \quad (5)$$

over all possible values of $s_1$ and $s_2$. The minimizing values in equation (5) are the receiver estimates of $s_1$ and $s_2$, respectively. Expanding the above metric and deleting the terms that are independent of the codewords, it can be observed that the above minimization is equivalent to minimizing $$-\sum_{j=1}^{m}(\Psi_1 + \Psi_2) + (|s_1|^2 + |s_2|^2)\sum_{j=1}^{m}\sum_{i=1}^{2}|\alpha_{i,j}|^2, \quad (6)$$

where $$\Psi_1 = [r_1^j \alpha_{i,j}^* s_1^* + (r_1^j)^* \alpha_{1,j} s_1 + r_2^j \alpha_{2,j}^* s_1^* + (r_2^j)^* \alpha_{2,j} s_1] \quad (7)$$

and $$\Psi_2 = [r_1^j \alpha_{2,j}^* s_2^* + (r_1^j)^* \alpha_{2,j} s_2 - r_2^j \alpha_{1,j}^* s_2^* - (r_2^j)^* \alpha_{1,j} s_2]. \quad (8)$$

The above metric decomposes into the two parts $$-\sum_{j=1}^{m}\Psi_1 + |s_1|^2 \sum_{j=1}^{m}\sum_{i=1}^{2}|\alpha_{i,j}|^2 \text{ and} \quad (9)$$

$$-\sum_{j=1}^{m}\Psi_2 + |s_2|^2 \sum_{j=1}^{m}\sum_{i=1}^{2}|\alpha_{i,j}|^2, \quad (10)$$

where equation (9) is only a function of $s_1$, and equation (10) is only a function of $s_2$. Thus, the minimization of equation (5), which is derived from equation (2), is achieved by minimizing equations (9) and (10) separately. This, in turn, is equivalent to minimizing the decision statistic $$\left|\sum_{j=1}^{m}(r_1^j \alpha_{1,j}^* + (r_2^j)^* \alpha_{2,j}) - s_1\right|^2 + \left(-1 + \sum_{j=1}^{m}\sum_{i=1}^{2}|\alpha_{i,j}|^2\right)|s_1|^2 \quad (11)$$

for detecting $s_1$, and the decision statistic $$\left|\sum_{j=1}^{m}(r_1^j \alpha_{2,j}^* + (r_2^j)^* \alpha_{1,j}) - s_2\right|^2 + \left(-1 + \sum_{j=1}^{m}\sum_{i=1}^{2}|\alpha_{i,j}|^2\right)|s_2|^2 \quad (12)$$

for decoding $s_2$.

From a careful look at the complex vectors that make up the matrix of equation (4) it can be observed that the pair of constellation symbols $(x_1,x_2)$ and $(-x_2^*,x_1^*)$ are orthogonal to each other (i.e., $(x_1,x_2)(-x_2^*,x_1^*)^H=0$), where the superscript H denotes transpose conjugate (Hermetian), and, therefore, they can constitute the two orthogonal coordinates of a coordinate system. Viewed in this manner, any pair of complex vectors, such as constellation symbols pair $X=(x_3,x_4)$, can be mapped onto the coordinate system defined by $(x_1,x_2)$ and $(-x_2^*,x_1^*)$, and expressed in this coordinate system as a vector $$P_X = (A_X, B_X). \quad (13)$$

That is, $$(x_3,x_4) = A_X(x_1,x_2) + B_X(-x_2^*,x_1^*), \quad (14)$$

where $A_X$ is the dot product of $(x_3,x_4)$ and $(x_1,x_2)$, and $B_X$ is the dot product of $(x_3,x_4)$ and $(-x_2^*,x_1^*)$. This yields $$A_X = x_3 x_1^* + x_4 x_2^*, \quad (15)$$

and $$B_X = -x_3 x_2 + x_4 x_1. \quad (16)$$

Defining V as the set of all vectors $P_X$ from signal pairs belonging to constellation A, it can be shown that, if the constellation A is restricted to phase shift keying (where the constellation points lie along the (power) unit circle), V has the following properties:

It has $2^{2b}$ elements corresponding to the pairs $(x_3,x_4)$ of constellation symbols.

All elements of V have unit length.

For any two distinct elements X and Y of V, $$\|P_X - P_Y\| = \|X - Y\|. \quad (17)$$

The minimum distance between any two distinct elements of V is equal to the minimum distance of the $2^b$-PSK constellation.

Now, given a block B of 2b bits, the first b bits are mapped into a constellation symbol $a_3$ and the second two bits are mapped into a constellation symbol $a_4$. Employing an arbitrary, fixed, starting pair of $(a_1,a_2)$ that belongs to constellation A $$\left(\text{for example } a_1 = a_2 = \frac{1}{\sqrt{2}}\right),$$

the complex vector pair $(a_3,a_4)$ is mapped to the coordinate system defined by the orthogonal vectors $(a_1,a_2)$ and $(-a_2^*, a_1^*)$, to yield the vector $P_X=(A_X,B_X)$ for $X=(a_3,a_4)$, or $P(B)=(A(B),B(B))$, where $$A(B)=a_3 a_1^* + a_4 a_2^*, \qquad (18)$$

and $$B(B)=-a_3 a_2 + a_4 a_1. \qquad (19)$$

Conversely, given A(B), and B(B), the pair $(a_3,a_4)$ is recovered in a receiver that knows the pair of $(a_1,a_2)$ by $$(a_3,a_4)=A(B)(a_1,a_2)+B(B)(-a_2^*,a_1^*). \qquad (20)$$

The block B is then constructed by inverse mapping of $a_3$ and $a_4$. Thus, there is a direct mapping from constellation symbol $a_3$ and $a_4$ to A(B), and B(B).

In accordance with the principles disclosed above transmitting unit 10 of FIG. 1 includes element 12 that receives the input signals and maps the input signal blocks with mapping operator M. Operator M corresponds to the mapping from bits of the input signal block directly to the complex vectors A(B), and B(B). The mapped signals are applied to symbol computation element 13, which with assistance with transmitted symbols from the previous two time intervals, computes symbols from constellation A corresponding to the mapped input signal block, and transmits them over antennas 11-1 and 11-2. Those symbols are then fed back to delay element 14 in preparation for the mapping of the next input signal block. Thus, based solely on $a_1$ and $a_2$, the transmitter begins the transmission with the sending of arbitrary symbols $s_1$ and $s_2$ at time slot 1 and symbols $-s_2^*$ and $s_1^*$ at time slot 2. These transmissions do not convey any information, but they are fed back to element 12, where they are used in the mapping of the next set of inputs, in an inductive manner, as effectively described above.

To illustrate, suppose that during a frame q (frames having 2 time slots each), symbols $s_{2q-1}$ and $s_{2q}$ are transmitted. More specifically, suppose symbols $s_{2q-1}$ and $s_{2q}$ are respectively transmitted from antenna 11-1 and 11-2, and at time slot 1, and the symbols $-s_{2q}^*$ and $s_{2q-1}^*$ are respectively transmitted from antenna 11-1 and 11-2 at time slot 2 of frame 1. Suppose further that at frame q+1, a block of 2b bits $B_{q+1}$ arrives at element 12. According to the above, element 12 uses the mapping of the form expressed in equations (18) and (19) to obtain $A(B_{q+1})$ and $B(B_{q+1})$, and element 12 computes the constellation points $$(s_{2(q+1)-1}, s_{2(q+1)})=(s_{2q+1},s_{2q+2})=A(B_{q+1})(s_{2q-1},s_{2q})+B(B_{q+1})(-s_{2q}^*,s_{2q-1}^*). \qquad (21)$$

Then, symbols $s_{2q+1}$ and $s_{2q+2}$ are transmitted from antennas 11-1 and 11-2, respectively at time slot 1, and symbols $-s_{2q+2}^*$ and $s_{2q-1}^*$ are transmitted from antennas 11-1 and 11-2, respectively, at time slot 2 of frame q+1. These signals are also sent to element 14 in preparation of the encoding of frame q+2. This process is inductively repeated until the end of the frame (or end of transmission).

The decoding of signals received by unit 20 is performed in detector elements 22-j, which are coupled to antennas j. Within element 22-j there is a delay element 221-j and dot product generators 222-j and 223-j. Dot product generator 222-j develops the dot product of $(r_{2q+1},r_{2q+2}^*)\cdot(r_{2q-1},r_{2q}^*)$ for the signals received at antenna j, and dot product generator 223-j develops the dot product of $(r_{2q+1},r_{2q+2}^*)\cdot(r_{2q}^*,-r_{2q-1}^*)$ for the signals received at antenna j.

Considering the outputs of element 21-1, and simplifying the notation by employing $r_t$ for $r_t^1$, $\eta_t$ for $\eta_t^1$, $\alpha_1$ for $\alpha_{1,1}$, and $\alpha_2$ for $\alpha_{2,1}$, it can be observed that the signal pairs $(r_{2q+1}, r_{2q+2}^*)$, $(r_{2q-1},r_{2q}^*)$, and $(r_{2q},-r_{2q-1}^*)$ can be expressed by $$(r_{2q+1},r_{2q+2}^*)=(s_{2q+1},s_{2q+2})\Lambda(\alpha_1,\alpha_2)+N_{2q+1}, \qquad (22)$$

$$(r_{2q-1},r_{2q}^*)=(s_{2q-1},s_{2q})\Lambda(\alpha_1,\alpha_2)+N_{2q-1}, \qquad (23)$$

and $$(r_{2q},-r_{2q-1}^*)=(-s_{2q}^*,s_{2q-1}^*)\Lambda(\alpha_1,\alpha_2)+N_{2q}, \qquad (24)$$

where $r_{2q-1},r_{2q},r_{2q+1}$, and $r_{2q+2}$ are the received signals, $$\Lambda(\alpha_1,\alpha_2)=\begin{pmatrix}\alpha_1 & \alpha_2^* \\ \alpha_2 & -\alpha_1^*\end{pmatrix}, \qquad (25)$$

and $$N_{2q-1}=(\eta_{2q-1},\eta_{2q}^*). \qquad (26)$$

Hence, taking the dot product of equations (23) and (22) within element 222-1 results in $$(r_{2q+1},r_{2q+2}^*)\cdot(r_{2q-1}^*,r_{2q}^*)=(s_{2q+1},s_{2q+2})\Lambda(\alpha_1,\alpha_2)\Lambda^*(\alpha_1,\alpha_2)(s_{2q-1}^*,s_{2q}^*)+(s_{2q+1},s_{2q+2})\Lambda(\alpha_1,\alpha_2)N_{2q-1}^*+N_{2q+1}\Lambda^*(\alpha_1,\alpha_2)(s_{2q-1},s_{2q})^*+N_{2q+1}N_{2q-1}^*. \qquad (27)$$

Expanding equation (27) results in an output for element 221-1 that is $$r_{2q+1}r_{2q-1}^*+r_{2q+2}^*r_{2q}=(|\alpha_1|^2+|\alpha_2|^2)(s_{2q+1}s_{2q-1}^*+s_{2q+2}^*s_{2q})+(s_{2q+1},s_{2q+2})\Lambda(\alpha_1,\alpha_2)N_{2q-1}^*+N_{2q+1}\Lambda^*(\alpha_1,\alpha_2)(s_{2q-1},s_{2q})^*+N_{2q+1}N_{2q-1}^*, \qquad (28)$$

which reduces to $$R_1=(|\alpha_1|^2+|\alpha_2|^2)A(B_{q-1})+N_1, \qquad (29)$$

where $$N_1=(s_{2q+1},s_{2q+2})\Lambda(\alpha_1,\alpha_2)N_{2q-1}^*+N_{2q+1}\Lambda^*(\alpha_1,\alpha_2)(s_{2q-1},s_{2q})^*+N_{2q+1}N_{2q-1}^*. \qquad (30)$$

Similarly, carrying out the mathematics of equations (27)-(30) for the dot product of $(r_{2q+1},r_{2q+2}^*)\cdot(r_{2q},-r_{2q-1}^*)$ within element 223-1 reveals that the output of element 223-1 corresponds to $R_2$, where $$R_2=(|\alpha_1|^2+|\alpha_2|^2)B(B_{q-1})+N_2. \qquad (31)$$

The vector pair $(R_1,R_2)$ at the output of detector 22-1 can then be expressed by $$(R_1,R_2)=(|\alpha_1|^2+|\alpha_2|^2)(A(B_{q-1}),B(B_{q-1}))+(N_1,N_2). \qquad (32)$$

The procedure disclosed above for antenna 12-1 is used for each of the j receive antennas, as depicted in FIG. 1, yielding a set of vectors $R_1^j$ and $R_2^j$, $j=1,2,\ldots,m$ that is applied to element 25, wherein the closest vector of V to $$\left(\sum_{j=1}^{m}R_1^j,\sum_{j=1}^{m}R_2^j\right)$$

is computed, following the approach disclosed above in connection with equations (5)-(12). Subsequently, the transmitted bits are computed by applying the inverse mapping $M^{-1}$ in element 26.

The above discloses the principles of this invention by way of analysis for a transmitter having two transmit antennas. It should be realized that various modifications are possible to be incorporated without departing from the spirit and scope of this invention and, in particular, it should be understood that extension to arrangements where there are more than two antennas is straight forward using, for example, the codes taught in U.S. patent application Ser. No. 09/186,908, titled "Generalized Orthogonal Designs for Space-Time Codes for Wireless Communication," which has the effective filing date of Nov. 11, 1997.

We claim:

1. A receiver comprising:
    a plurality of receiving elements, each responsive to a respective applied signal and developing two output signals;
    a minimum distance decoding element responsive to the output signals of all of the plurality of receiving elements; and
    a post processing element responsive to output signals of the minimum distance decoding element;
    where each of the receiving elements includes a delay element and two dot product elements for developing said two output signals of the receiving elements, with the delay element and the two dot product elements receiving said respective applied signal as an input, and the two dot product elements also receiving an output signal of the delay element as another input.

2. The receiver of claim 1 where each the dot product element operate on frames of signals r, and each dot product element develops the product $(r_{2q+1}, r_{2q+2}^*) \cdot (r_{2q-1}, r_{2q}^*)$ where $r_j$ is the signal of frame j, $r_j^*$ is the complex conjugate of $r_j$, where j is 2q−1, 2q, 2q+1 and 2q+2.

* * * * *